(12) United States Patent
Bornhoevd et al.

(10) Patent No.: US 8,352,510 B2
(45) Date of Patent: Jan. 8, 2013

(54) DYNAMIC DATABASE SCHEMAS FOR HIGHLY IRREGULARLY STRUCTURED OR HETEROGENEOUS DATA

(75) Inventors: Christof Bornhoevd, Belmont, CA (US); Horst Werner, Muehlhausen-Rettigheim (DE)

(73) Assignee: SAP AG, Walldorf (DE)

( * ) Notice: Subject to any disclaimer, the term of this patent is extended or adjusted under 35 U.S.C. 154(b) by 578 days.

(21) Appl. No.: 12/111,703

(22) Filed: Apr. 29, 2008

(65) Prior Publication Data

US 2009/0271419 A1 Oct. 29, 2009

(51) Int. Cl.
*G06F 7/00* (2006.01)
*G06F 17/30* (2006.01)

(52) U.S. Cl. .................. 707/803; 707/809
(58) Field of Classification Search .............. 707/803, 707/809
See application file for complete search history.

(56) References Cited

U.S. PATENT DOCUMENTS

| | | | | |
|---|---|---|---|---|
| 6,035,303 | A * | 3/2000 | Baer et al. ............. | 1/1 |
| 6,687,704 | B1 * | 2/2004 | Russell ................. | 1/1 |
| 2005/0289170 | A1 * | 12/2005 | Brown et al. .......... | 707/101 |

OTHER PUBLICATIONS

Argawal, R. et al. 'Storage and Querying of E-Commerce Data'. In Proc. 27th VLDB Conference, 2001. Roma, Italy.
Copland, G.P. and Khoshafian S. 'A Decomposition Storage Model'. In Proc. ACM SIGMOD, 1985. Austin, Texas.
Florescu D. and Kossman D. 'A Performance Evaluation of Alternative Mapping Schemes for Storing XML Data in a Relational Database'. Technical Report, May 1999. Inria, France.
Missikoff, M. 'A Domain-Based Internal Schema for Relational Database Machines'. In Proc. ACM SIGMOD, 1982. Florida, USA.
W3C. Resource Description Framework (RDF): Concepts and Abstract Syntax. W3C Recommendation, Feb. 10, 2004.

* cited by examiner

*Primary Examiner* — Mariela Reyes
(74) *Attorney, Agent, or Firm* — Fish & Richardson P.C.

(57) ABSTRACT

One or more data items of one or more types are received, wherein each data item is associated with one or more attributes, and wherein each attribute is associated with an attribute name and an attribute value. A key is calculated for each attribute, and a determination as to whether the key is located in a dictionary is made. The key is added to the dictionary based on the determination along with an attribute description, and a determination of a number of occurrences of one of the one or more items to the number of all the one or more items in a set is made. Based on this number of occurrences attributes are classified as either mandatory, expected or optional in the generated template for the corresponding info item type.

10 Claims, 4 Drawing Sheets

DYNAMIC DATABASE SCHEMAS FOR HIGHLY IRREGULARLY STRUCTURED OR HETEROGENEOUS DATA

BACKGROUND

The disclosure relates to information management.

Business decisions rely on the ability to search, classify, aggregate, and analyze content of structured, semi-structured and unstructured data from possibly many heterogeneous sources in coherent ways. Having distinct systems for database content (structured data) and files (semi-structured or unstructured data) is complicated, expensive and non-uniform in functionality.

To support the processing of data of different types or from heterogeneous sources, a more flexible data model is needed than, for example, the relational database model or classical object-oriented data models that enforce a very static pre-defined data schema into which all data needs to be forced.

SUMMARY

Disclosed herein are systems, apparatus and methods for generation and maintenance of schemas (i.e. structural metadata) for highly irregularly structured data from possibly multiple heterogeneous sources.

In one implementation, a multiplicity of data items of one or more types are received, wherein each item is associated with one or more attributes, and wherein each attribute is associated with an attribute name and an attribute value. The schema to which the items of the respective types comply is dynamically learned by the information management system as follows: The attributes of all items of a given type are analyzed. A unique key is calculated for each attribute that occurs, and stored together with an attribute description, including the number of occurrences in a dictionary. By comparing the number of occurrences with the number of items of the given type, it can be determined whether the corresponding attribute is mandatory, to be expected or optional and, if so, it is described as such in the learned schema.

Implementations may include one or more of the following features. A threshold can be specified. If an attribute occurs with more than the threshold of data item instances of a specific type, the corresponding attribute can be marked as a typical attribute that can be expected for data items of this type. The attribute description can be added to the template as a mandatory attribute if the number of occurrences divided by the number of items is above or equal to the threshold. The attribute description can be added to the template as an expected attribute if the number of occurrences divided by the number of items is less than a first given threshold and greater than a second given threshold. The attribute description can be added to the template as an optional attribute if the number of occurrences divided by the number of data items is less than a given threshold.

According to another general implementation, a system includes a processor, and a computer-readable medium coupled to the processor and having instructions stored thereon, which, when executed by the processor, causes the processor to perform operations comprising receiving a plurality of items of one or more types, wherein each item is associated with one or more attributes, wherein each attribute is associated with an attribute name and an attribute value, calculating a key for each attribute of each item, and determining whether the key is located in a dictionary. The processor also performs operations comprising adding the key to the dictionary based on the determination along with an attribute description, calculating a number of occurrences of each key in the dictionary in relation to a number of the plurality of items, classifying each attribute as a mandatory type, an expected type, or an optional type based on the calculated number of occurrences, and creating a template for each type.

According to a further general implementation, a computer program product, tangibly embodied in a machine-readable medium, the computer program product comprising instructions that, when read by a machine, operate to cause data processing apparatus to receive a plurality of items of one or more types. Each item is associated with one or more attributes, wherein each attribute is associated with an attribute name and an attribute value, and calculate a key for each attribute of each item. The computer program product also includes instructions that operate to cause the data processing apparatus to determine whether the key is located in a dictionary, add the key to the dictionary based on the determination along with an attribute description, and calculate a number of occurrences of each key in the dictionary in relation to a number of the plurality of items. The computer program product also includes instructions that operate to cause the data processing apparatus to classify each attribute as a mandatory type, an expected type, or an optional type based on the calculated number of occurrences, and create a template for each type.

DETAILED DESCRIPTION

Figure 1:
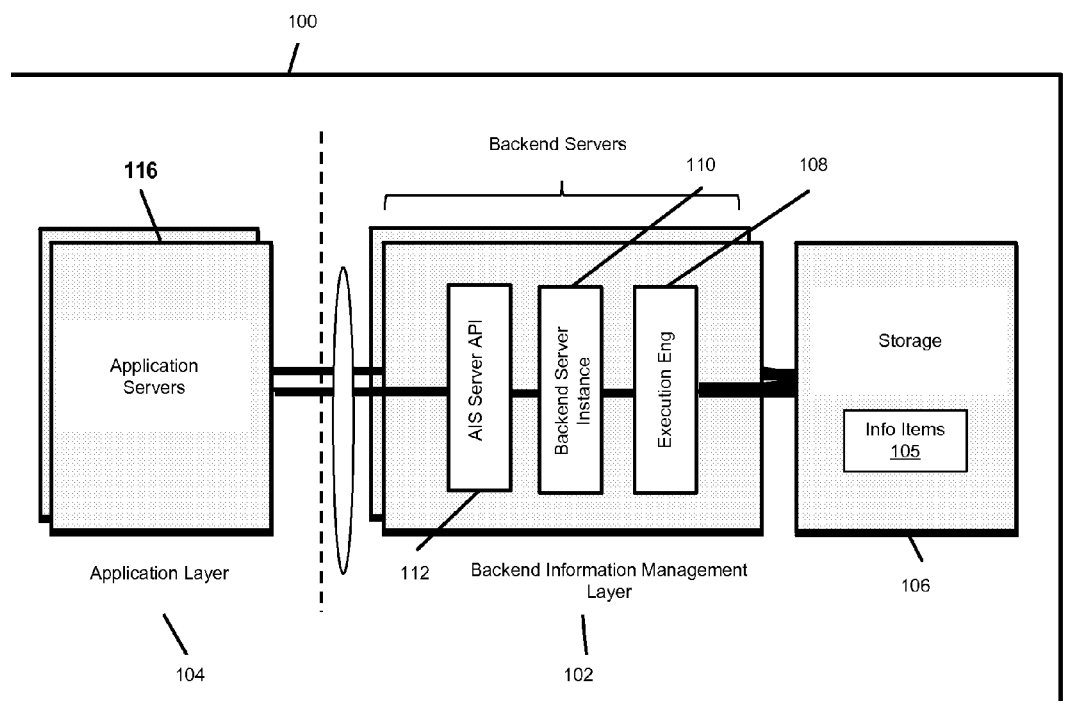
FIG. 1 is a block diagram of an implementation of an information management system.

FIG. 1 is a block diagram of an implementation of a system 100 that can be used to implement the invention. In one implementation, the information management system 100 can include a backend information management layer 102 providing data management and persistency functionality, and an application layer 104 hosting applications that make use of the information management system. The system 100 can, for example, be implemented in the example computer system of FIG. 4.

The backend information management layer 102 may include a storage device 106. Data items (such as info items 105) and their associations are stored in the storage device 106. Application servers 116 that make use of the information management system's functionality can be deployed at the application layer 104 and can access a backend server instance 110 via a stateless Server API 112.

The application servers 116 contain the application logic and interact with the application servers. In one implementation, a separate UI layer can exist. In other implementations, the application servers 116 can also be invoked by web service calls.

The storage device 106 can store the info items 105 which are collections of attributes and which play the role of data objects in a conventional database, and associations, which associate the info items 105 with each other. In one implementation, attributes associate info items with attribute values. A set of info items 105 can, for example, either be defined by explicitly listing its elements or by describing the way it is created out of other sets, e.g., by filtering or set unification.

This data model of info items and associations for the information management system 100 allows the uniform handling and the correlation of structured (e.g. relational), semi-structured (e.g. irregularly structured XML documents), and unstructured data (e.g. text documents).

With this model data items (facts) of different kind are represented as info items 105. Info items 105 are the unit of retrieval, extraction and correlation of data in the information management system 100. An info item 105 provides a single uniquely identifiable data item instance which has assigned a set of associations which can either associate one or multiple values of built-in representation types to the info item 105, or that represent relationships between the info item 105 and other info items.

Associations that associate values to an info item are called attributes. Attributes are a special case of associations in the data model. In one implementation, attributes can have one of four primitive representation types: string (character string of variable length in Unicode representation), number (numeric values of integer or float number type), boolean (to represent the values true, false and unknown), and binary (to represent pictures, audio or video clips), and can have multiple values of the same representation type (e.g. multiple color values).

"Non-attribute" associations simply describe relationships (bidirectional) between pairs of info items 105. The same pair of info items 105 can be related via multiple associations. Info items 105 and associations can have assigned a type label that indicates the assumed item class or relationship category of the info item and association, respectively. These type labels can be taken from a domain-specific taxonomy that is provided to the information management system 100 as semantic metadata. In this way, type labels can provide a first hook to make the intended meaning of an info item more explicit by putting it into the context of a taxonomy of type denominators.

Figure 2:
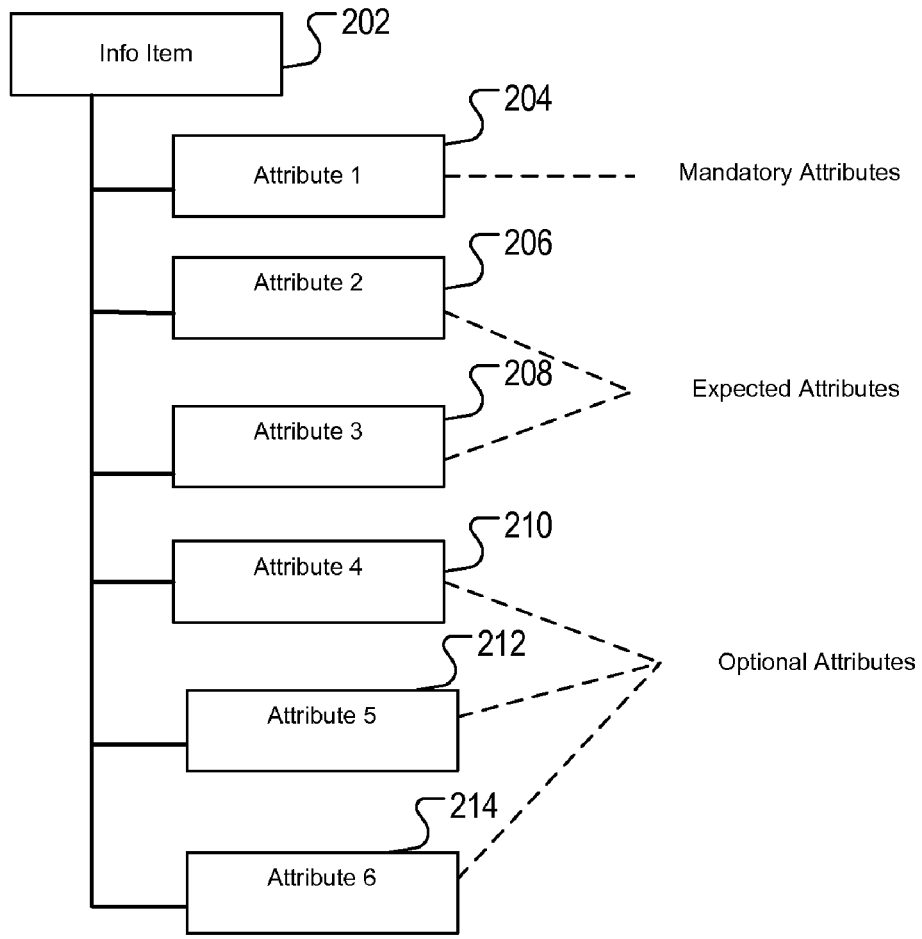
FIG. 2 is a block diagram displaying an example of a system learned database schema.

FIG. 2 illustrates an info item 202 with one or more type labels. In one implementation, type labels can also be associated with a type template, such as type template 200, which provides information about the structure, i.e., associations, to be expected of the info item 202 of the corresponding type. For example, with the type template 200, a set of "mandatory" attributes 204, which have to be given for each info item 202 of the respective type, "expected" attributes 206 and 208 that can be expected and should be provided for an info item 202 of the respective type, and "optional" attributes 210, 212, and 214 that describe additional aspects of the info item 202 that might only be given by the specific source of the data, can be indicated.

Info items that have assigned the same type label may, and generally have, different sets of attributes. However, mandatory attributes 204 and expected attributes 206 and 208 provide guidelines for the expected structure of info items of the respective type 202. Similarly, associations are specified on instance level, i.e., they relate two specific info items. That means that info item instances of the same types can be correlated through different types of associations.

In one implementation, type templates, such as the type template 200 can be defined to describe info items in an abstract way. Such templates can be defined by the user in order to perform queries or filter sets of info items 105, but they can also be synthesized, i.e., learned by the information management system, by analyzing the common attributes and associations of items in a set of info items. By using type templates, a simple kind of pattern matching can be performed.

The schema information (i.e., type templates) is generated by continuously exploring the structure of the data objects in the system. For the collection of information about "expected" and "mandatory" and "optional" attributes and associations, different strategies are possible. In the simplest case, the system 100 can scan over all data objects of a type and identify all attributes that are given for at least 95% of all objects as "expected" and all others as "optional" attributes for this type. Another method may use data sampling to find out about the typical availability of attributes for each object type.

In one implementation, the type template 200 is a collection of attribute descriptions, each containing an attribute name, the type of the value, and a flag that tells whether the attribute is mandatory, expected or optional.

In one implementation, the type templates can be achieved according to the following. For an attribute description, a unique key is introduced that is calculated from the attribute name and the type of the attribute value. When analyzing a set of info items, an empty dictionary is created which associates the mentioned keys to the attribute descriptions.

First, the process iterates over all info items in the set, and over all attributes of each info item. The key for each attribute is calculated and looked up in a dictionary. The key is a unique key that is calculated from the attribute name and the type of the attribute value. If not found, the key is added to the dictionary, along with the attribute description, and the number of the attribute's occurrences is kept in the dictionary. This number is increased by one whenever a matching attribute is processed in the loop.

A system threshold is defined for the learning process, e.g., $t=0.95$. In a second step, the system iterates over all keys in the dictionary and depending on the ratio "r" between the occurrences to the number of info items in the set, the corresponding attribute description is added to the template as mandatory ($r=1$), expected ($t<=r<1$) or optional ($r<t$) attribute.

In one implementation, not only attribute types but also concrete attribute values are covered by attribute descriptions. Therefore, a template can express e.g., that all info items in a set live in New York City rather than only stating they live in a city.

In another implementation, the types of the attributes are organized in a taxonomy. Therefore, when an attribute is processed, the process also recursively processes all abstractions of the attribute, i.e., descriptions that have the same attribute name and where the type is the parent of the attribute type in the taxonomy. These abstractions are kept in the dictionary with their own keys and their number of occurrences is increased together with that of each of the corresponding concrete attribute descriptions. For example, there could be a type "vehicle," with the subtypes "car" and "motorcycle" defined in the taxonomy. If there is a given set of parts, having an attribute "used in," which for all items in the set points either to a car instance or to a motorcycle instance (or both), the template would contain the description of a mandatory attribute "used in some vehicle".

Figure 3:
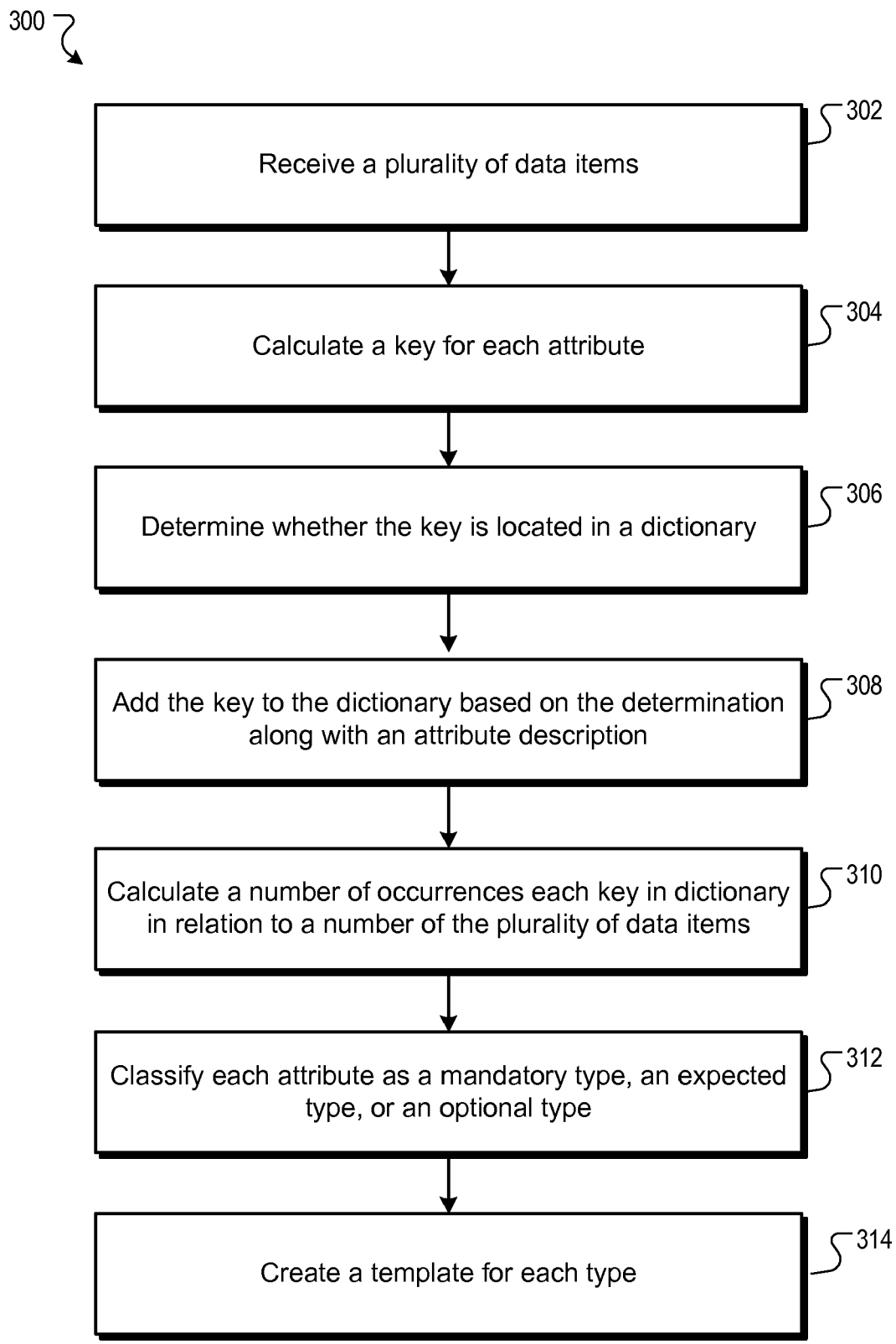
FIG. 3 is a flow diagram of an example process for building a template.

FIG. 3 is a flow diagram of an example process 300 for handling access to data items in a database (such as info items 105). The process 300 can, for example, be implemented in a system such as the system 100 of FIG. 1.

Step 302 receives a plurality of data items of one or more types, wherein each data item is associated with one or more attributes, and wherein each attribute is associated with an attribute name and an attribute value. For example, the execution engine 108 can receive a plurality of data items of one or more types, wherein each data item is associated with one or more attributes, wherein each attribute is associated with an attribute name and an attribute value.

Step 304 calculates a key for each attribute of each data item. For example, the execution engine 108 can calculate a key for each attribute of each data item (such as each of the info items 105). The key is a unique key that is calculated from the attribute name and the type of the attribute value.

Step 306 determines whether the key is located in a dictionary. For example, the execution engine 108 can determine whether the key is located in a dictionary. If the key is already in the dictionary, a number of occurrences of the attribute in the dictionary is increased.

Step 308 adds the key to the dictionary based on the determination along with an attribute description. For example, the execution engine 108 can add the key to the dictionary based on the determination along with an attribute description. The steps 304 to 308 are executed in a loop for all items and attributes.

Step 310 calculates a number of occurrences of each key in the dictionary in relation to a number of the plurality of data items. For example, the execution engine 108 can calculate a number of occurrences of each key in the dictionary in relation to a number of the plurality of data items (such as the info items 105).

Step 312 classifies each attribute as a mandatory type, an expected type, or an optional type based on the calculated number of occurrences. For example, if the number occurrences is equal to "1," the attribute is labeled as "mandatory," If the occurrences are between "0.95" and "1," the attribute is labeled as "excepted," and if the occurrences are equal or below "0.95," the attribute is labeled as "optional."

Step 314 creates a template of each type. For example, the execution engine 108 can create a template for mandatory attributes, expected attributes, and optional attributes. The attribute description may be added to the template based on the number of occurrences of each key in relation to the number of the plurality of data items.

For example, suppose there is a set of 100 people (plurality of data items). For each person in this set, a "date of birth" attribute is maintained. For 77 persons out of the set, a "date of death" attribute is maintained as well (therefore, the system receives a plurality of data items with one or more attributes). The system 100 first considers the first person in the set and iterates over all attributes associated with the first person. One attribute, "date of birth" is identified and a unique key is calculated from the association type "has attribute" and the unique ID "date of birth." Suppose the unique key that is calculated for the "date of birth" attribute is "attr4711." This key is looked up in a dictionary. However, no corresponding entry for this unique key exists in the database. Therefore, a new counter object is created and stored in the dictionary under the key "attr4711." Now the counter is increased by one, since the first person is associated with the unique key "attr4711." Suppose the unique key that is calculated for the "date of death" attribute is "attr4712." No corresponding entry for this unique key exists as well, therefore another counter object is created and stored in the dictionary under the key "attr4712," and increased by one, since the first person is associated with the unique key "attr4712."

For the next person in the set that has a "date of birth" attribute, the counter of the "date of birth" attribute "attr4711" is found in the dictionary and increased by one. After iterating over all persons, all entries in the dictionary are analyzed. The entry "attr4711" has a counter value of 100, because all 100 people had a "date of birth" attribute, and therefore the corresponding attribute "date of birth" occurs in 100% of all evaluated data sets and thus is added to the schema as a mandatory attribute. The key "attr4712" is associated with a counter that has a value of 77, because only 77 people were associated with a "date of death" attribute. Therefore, depending on the defined threshold, the "date of death" attribute is either an expected or optional attribute in the schema.

Figure 4:
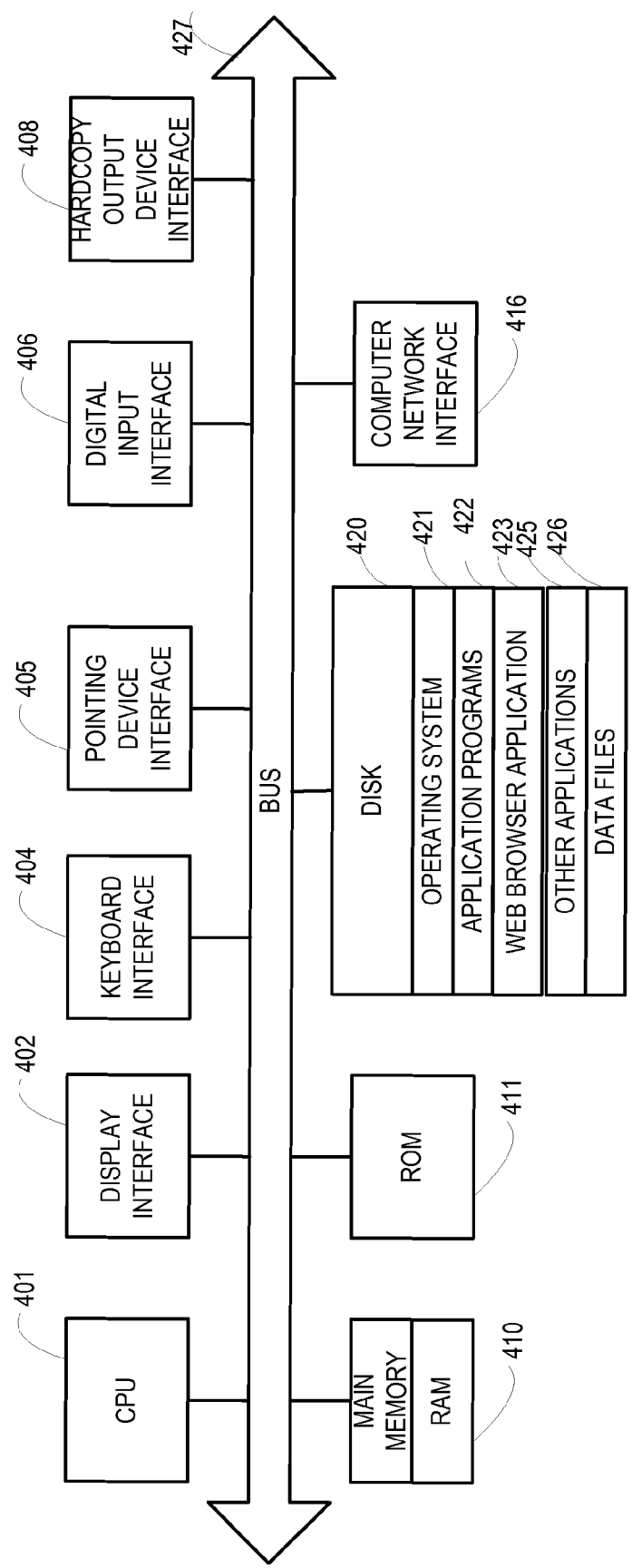
FIG. 4 is a schematic diagram of an example computer system that can be utilized to implement the systems and methods described herein.

FIG. 4 is a block diagram illustrating the internal architecture of an example computer system. The computing environment includes a computer central processing unit ("CPU") 401 where the computer instructions that comprise an operating system or an application are processed; a display interface 402 which provides a communication interface and processing functions for rendering graphics, images, and texts on a display monitor; a keyboard interface 404 which provides a communication interface to a keyboard; a pointing device interface 405 which provides a communication interface to a mouse or an equivalent pointing device; a digital input interface 406 which provides a communication interface to a video and audio detector; a hardcopy output device interface 408 which provides a communication interface to a hardcopy output device; a random access memory ("RAM") 410 where computer instructions and data are stored in a volatile memory device for processing by the computer CPU 401; a read-only memory ("ROM") 411 where invariant low-level systems code or data for basic system functions such as basic input and output ("I/O"), startup, or reception of keystrokes from a keyboard are stored in a non-volatile memory device; a storage 420 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 421, application programs 422 (including web browser application 423, product engine 424, and other applications 425 as necessary) and data files 426 are stored; and a computer network interface 416 which provides a communication interface to a network over a computer network connection. The constituent devices and the computer CPU 401 communicate with each other over the computer bus 427.

The RAM 410 interfaces with the computer bus 427 to provide quick RAM storage to the computer CPU 401 during the execution of software programs such as the operating system application programs, and device drivers. More specifically, the computer CPU 401 loads computer-executable process steps from fixed disk drives or other media into a field of the RAM 410 in order to execute software programs. Data is stored in the RAM 410, where the data is accessed by the computer CPU 401 during execution.

Also shown in FIG. 4, the information management system 100 can store computer-executable code for an operating system 421, and application programs 422 such as word processing, spreadsheet, presentation, gaming, web browsing, JavaScript engine, or other applications.

The computer CPU 401 is one of a number of high-performance computer processors, including an INTEL or AMD processor, a POWERPC processor, a MIPS reduced instruction set computer ("RISC") processor, a SPARC processor, an ACORN RISC Machine ("ARM") architecture processor, a HP ALPHASERVER processor or a proprietary computer processor for a mainframe. In an additional arrangement, the computer CPU 401 is more than one processing unit, including a multiple CPU configuration found in high-performance workstations and servers, or a multiple scalable processing unit found in mainframes.

The operating system 421 may be APPLE MAC OS X for INTEL and POWERPC based workstations and servers; MICROSOFT WINDOWS NT®/WINDOWS 2000/WINDOWS XP Workstation; MICROSOFT WINDOWS VISTA/WINDOWS NT/WINDOWS 2000/WINDOWS XP Server; a variety of UNIX-flavored operating systems, including AIX for IBM workstations and servers, SUNOS for SUN workstations and servers, LINUX for INTEL CPU-based workstations and servers, HP UX WORKLOAD MANAGER for HP workstations and servers, IRIX for SGI workstations and servers, VAX/VMS for Digital Equipment Corporation computers, OPENVMS for HP ALPHASERVER-based computers; SYMBIAN OS, NEWTON, IPOD, WINDOWS MOBILE or WINDOWS CE, PALM, NOKIA OS ("NOS"), OSE, or EPOC for mobile devices, or a proprietary operating system for computers or embedded systems. The application development platform or framework for the operating system 421 may be BINARY RUNTIME ENVIRONMENT FOR WIRELESS ("BREW"); Java Platform, Micro Edition ("Java ME") or Java 2 Platform, Micro Edition ("J2ME"); PYTHON™, FLASH LITE, or MICROSOFT .NET Compact.

While FIG. 4 illustrates one possible implementation of a computing system that executes program code, or program or process steps, configured to make product authentication, other types of computers may also be used as well.

Finally, it is noted that, for the sake of brevity, the term "JavaScript" is intended to reference the SUN MICROSYSTEMS JAVASCRIPT programming language, and the term "XML" is intended to reference 'extensible Markup Language' throughout.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method, comprising:
   receiving a plurality of data items of one or more types, wherein each data item is associated with one or more attributes and each attribute is associated with an attribute name and an attribute value, with two or more data items each being associated with a same attribute of the one or more attributes;
   calculating a plurality of keys, each key corresponding to an attribute of the one or more attributes, each key based on the attribute name and the attribute value of each attribute, wherein a particular key of the plurality of keys corresponds to the same attribute that is associated with the two or more data items;
   determining whether each key of the plurality of keys is found in a dictionary;
   adding a key of the plurality of keys to the dictionary along with an attribute description when it is determined that the key is not found in the dictionary;
   calculating a number of occurrences of each key in the dictionary in relation to a number of the plurality of data items;
   classifying each attribute as a mandatory type, an expected type, or an optional type based on the calculated number of occurrences;
   creating a template for each type;
   adding the attribute description to the template based on the number of occurrences of each key in relation to the number of the plurality of data items, including:
      adding the attribute description to the template as a mandatory attribute if the number of occurrences divided by the number of data items is above or equal to the first given threshold;
      adding the attribute description to the template as an expected attribute if the number of occurrences divided by the number of data items is less than a first given threshold and greater than or equal to a second given threshold; and
      adding the attribute description to the template as an optional attribute if the number of occurrences divided by the number of data items is less than the second given threshold.

2. The method of claim 1, further comprising:
increasing a number of occurrences of each attribute when it is determined that the key associated with the attribute is found in the dictionary.

3. A system, comprising:
a processor;
a computer-readable medium coupled to the processor and having instructions stored thereon, which, when executed by the processor, causes the processor to perform operations comprising:
   receiving a plurality of data items of one or more types, wherein each data item is associated with one or more attributes and each attribute is associated with an attribute name and an attribute value, with two or more data items each being associated with a same attribute of the one or more attributes;
   calculating a plurality of keys, each key corresponding to an attribute of the one or more attributes, each key based on the attribute name and the attribute value of each attribute, wherein a particular key of the plurality of keys corresponds to the same attribute that is associated with the two or more data items;
   determining whether each key of the plurality of keys is found in a dictionary;
   adding a key of the plurality of keys to the dictionary along with an attribute description when it is determined that the key is not found in the dictionary;
   calculating a number of occurrences of each key in the dictionary in relation to a number of the plurality of data items;
   classifying each attribute as a mandatory type, an expected type, or an optional type based on the calculated number of occurrences;
   creating a template for each type;
   adding the attribute description to the template as a mandatory attribute if the number of occurrences divided by the number of data items is above or equal to the first given threshold;
   adding the attribute description to the template as an expected attribute if the number of occurrences divided by the number of data items is less than a first given threshold and greater than or equal to a second given threshold; and
   adding the attribute description to the template as an optional attribute if the number of occurrences divided by the number of data items is less than the second given threshold.

4. The system of claim 3, further comprising operations including:

increasing a number of occurrences of each attribute when it is determined that the key associated with the attribute is found in the dictionary.

5. The system of claim 3, further comprising operations including:
adding the attribute description to the template based on the number of occurrences of each key in relation to the number of the plurality of data items.

6. The system of claim 3, wherein the attribute descriptions include attribute values and attribute types.

7. The system of claim 3, wherein the mandatory attributes are attributes that are necessary for each data item.

8. A non-transitory computer program product, tangibly embodied in a machine-readable medium, the computer program product comprising instructions that, when read by a machine, operate to cause data processing apparatus to:
receive a plurality of data items of one or more types, wherein each data item is associated with one or more attributes and each attribute is associated with an attribute name and an attribute value, with two or more data items each being associated with a same attribute of the one or more attributes;
calculate a plurality of keys, each key corresponding to an attribute of the one or more attributes, each key based on the attribute name and the attribute value of each attribute, wherein a particular key of the plurality of keys corresponds to the same attribute that is associated with the two or more data items;
determine whether each key of the plurality of keys is found in a dictionary;
add a key of the plurality of keys to the dictionary along with an attribute description when it is determined that the key is not found in the dictionary;
calculate a number of occurrences of each key in the dictionary in relation to a number of the plurality of data items;
classify each attribute as a mandatory type, an expected type, or an optional type based on the calculated number of occurrences;
create a template for each type;
adding the attribute description to the template as a mandatory attribute if the number of occurrences divided by the number of data items is above or equal to the first given threshold;
add the attribute description to the template as an expected attribute if the number of occurrences divided by the number of data items is less than a first given threshold and greater than or equal to a second given threshold; and
add the attribute description to the template as an optional attribute if the number of occurrences divided by the number of data items is less than the second given threshold.

9. The computer program product of claim 8, wherein the data processing apparatus is further operable to:
increase a number of occurrences of each attribute when it is determined that the key associated with the attribute is found in the dictionary.

10. The computer program product of claim 8, wherein the data processing apparatus is further operable to:
add the attribute description to the template based on the number of occurrences of each key in relation to the number of the plurality of data items.

* * * * *